Patented July 5, 1932

1,866,205

UNITED STATES PATENT OFFICE

ROBERT M. GREENLEAF, OF LOS ANGELES, CALIFORNIA, ASSIGNOR TO FROSTED WOOL PROCESS COMPANY, A CORPORATION OF NEVADA

PROCESS OF CLEANING WOOL

No Drawing.    Application filed March 3, 1932. Serial No. 596,671.

The present application is a continuation in part of my application Serial No. 528,234 filed April 6, 1931 and the invention is a new process for removing foreign matters, such as burrs, chaff, vegetable and mineral matters, paint, tar, etc. from wool or other animal fibres; the removal of such matters being difficult to properly accomplish by the present known methods.

When wool is sheared from sheep it contains more or less vegetable and other foreign solid matters such as burrs, chaff, and manure and sometimes has paint, tar etc. clinging thereto, which foreign matters are difficult and expensive to remove by the heretofore known processes.

In my process the wool after it has been moistened and while the foreign matters therein are moist is subjected to a temperature sufficiently low to freeze the moisture in or adhering to the vegetable or other foreign matters in the wool but without freezing or injury to the wool, thereby rendering such foreign matters hard and facilitating the subsequent removal thereof from the unfrozen wool by a "picker", or other suitable mechanical apparatus.

The freezing will harden, reinforce or strengthen the foreign matters clinging to the wool, thereby preventing to the greatest degree possible the disintegration of the natural structure of the various unrelated foreign matters, such as wool fibres, burrs, tar particles, etc., and assuring a cleaner separation of the foreign matters from the wool. In my process the wool fibres are not frozen and remain soft and pliable but each separate piece of foreign matter is rendered so hard that it can be readily detached from the wool. Such freezing lessens the hold of the foreign matters on the wool, and enables the picker to remove the hard frozen foreign matters intact.

Customarily the sheared wool is sorted and usually passed through a so-called grease wool duster to free it from loose dirt, sand and other easily separable impurities. The wool is then usually washed in soapy water baths, then rinsed in clear water, and then the surplus free water is removed, leaving the washed wool and foreign matters therein moist.

Heretofore such washed wool has been (a) dried and picked to remove impurities by passing it through so-called mechanical "burr pickers"; or (b) where the moist wool contains a large percentage of foreign matters, such as burrs, etc., it is treated with a chemical or acid bath and then subjected to heat sufficient to carbonize such foreign matters. Such "carbonizing" process however is injurious to the wool, and renders it less valuable; or (c) in some cases the wool has been subjected to both the aforesaid picking and carbonizing steps (a) and (b).

In my process I do not use the step or steps (a), (b) or (c). Instead the washed wool and foreign matters while moist are subjected to a temperature which will freeze the moisture in or adhering to the foreign matters in the wool but not freeze the wool fibres, and then the so frozen foreign matters are removed. In my process the wool fibres are not frozen, this is important, and the fibres retain their original strength and the oil in or on the wool fibres is retained and also the marrow in the fibres. The freezing renders the foreign matters hard and prevents disintegration thereof when they are struck by pickers during the mechanical separation thereof and facilitates their detachment from the wool.

In my process the wool fibre is flexible at all times; the major portion of the water removed is in the form of ice which readily separates from the wool fibres when they are agitated. The moisture in or adhering to the foreign matters (such as burrs, shives, tar, etc.) is frozen or congealed and renders the foreign matters hard and unyielding so that when the wool and foreign matters pass to the picker the foreign matters will be knocked clear of the wool without disintegrating, as they would ordinarily do if not frozen.

In my process the foreign matters can be readily detached while in this frozen condition from the wool; whereas if it was attempted to remove them unfrozen they would cling to the wool and rupture and disintegrate, and only be partially removed from the wool, and the burrs themselves would tend to shred and elongate into fibres which would be impossible to detach to separate from the wool.

In practicing my process I preferably proceed as follows:

After the wool has been sorted and washed in the usual manner the moist wool is placed in an automatic feeder which delivers it continuously and uniformly in a distended or thin layer onto a traveling apron that carries it into a chamber wherein it is subjected to a temperature of about 0° F. which rapidly brings about the desired frozen condition of all foreign matters in the wool, the wool fibres being loosened and separated in a fluffy condition while being subjected to the freezing operation.

The wool with the hard frozen foreign matters therein is then delivered to a mechanical "picker" which combs the wool fibres parallel with their line of travel through the machine into a continuous thin and distended sheet or layer, and subjects such layer to combers or beaters, revolving at a high rate of speed, that knock off the frozen burrs and other foreign particles adhering to the wool. In case the frozen foreign matters are in chunks or masses too large for the picker to handle, such chunks or masses can be crushed by any suitable means prior to passing to the picker. Any moisture adhering to the wool fibres will be frozen and be separated from the fibres by the agitation thereof in passing to or through the picker.

The moisture in and adhering to the foreign matters is frozen and the foreign matters are encased partly or wholly in ice or filled with ice and rendered stiff and hard so that when struck by the picker teeth the foreign matters will be torn away from the wool and thrown out, and as they break away without disintegration the wool is left exceptionally clean and free from impurities upon completion of the picking operation. After passing the picker the cleaned wool can be readily dried with air at normal atmospheric temperature.

Vegetable matters are easily disintegrated if not frozen and when disintegrated are very difficult to remove from wool. Heretofore it has been impossible to remove so-called "spiral burrs" except by the "carbonizing" process, or by hand, as the pickers will break the burrs into fragments, but by my process these burrs can be removed intact while frozen with a minimum of injury to the wool. Such burrs will absorb and retain water, and when frozen they become hard and their tendency to uncoil or disintegrate into fibre-like pieces is practically eliminated, and when struck by a picker the frozen burrs will be thrown out of the wool. If the foreign matters were not frozen the pickers or mechanical devices could not properly remove them because unfrozen burrs instead of being thrown clear of the wool would break or uncoil into barbed fibres which become more and more inseparably mixed with the wool fibres and will pass through the picker with the wool.

It is also difficult to remove shives and chaff from wool by the heretofore known processes, as they are small, light and feathery; but in my process the shives and chaffs when moistened and frozen increase in size and weight, and become comparatively solid, due to the ice which coats and joins their prongs together, and in such frozen condition they can be readily detached from and thrown out of the wool by the picker.

In my process the burrs and other foreign matters can be removed intact, as in their frozen condition the particles have many times their natural cohesive strength and will easily withstand the mechanical treatment necessary to remove them. Furthermore, they can be more easily picked from the wool and have less tendency to recling to the wool when once loosened therefrom.

The process might be employed to clean other animal fibres than wool and possibly silk and some vegetable fibres that would not be frozen or hardened by the temperature required to freeze the foreign matters and therefore would enable the frozen foreign matters to be removed from the fibres in the manner hereinbefore set forth.

I claim:—

1. The process of cleaning wool or other animal fibres of extraneous foreign matters clinging thereto, consisting in washing the wool and foreign matters and subjecting the wool and foreign matters while moist to a freezing temperature for a time sufficient to freeze the moisture in or adhering to the foreign matters but not freeze the wool; and then removing the frozen foreign matters from the wool.

2. The process of cleaning wool or other animal fibres of extraneous foreign matters clinging thereto; which includes moistening the wool and foreign matters and then subjecting the mass while moist to a freezing temperature higher than the freezing point of the wool fibre and for a time sufficient to freeze the moisture in or on the foreign matters; and separating the frozen foreign matters from the wool.

3. The process of cleaning wool or other animal fibres of extraneous vegetable and mineral matters clinging thereto which includes the moistening of the wool and said vegetable and mineral matters, and then subjecting the mass while moist to a freezing operation at a temperature which will not freeze the wool and for a time sufficient to freeze the moisture in or on the foreign matters; and then removing the frozen foreign matters from the wool.

4. The process of separating extraneous foreign matters from wool or other animal fibres; consisting in moistening the wool and foreign matters and subjecting the same to a low temperature for a time to freeze the foreign matters but not dry them and not freeze the wool, and then separating the foreign matters while in a frozen condition from the wool.

5. The process of cleaning wool or other animal fibres of extraneous vegetable and mineral matters clinging thereto; consisting in washing the mass of wool and foreign matters, removing surplus water from the mass, subjecting the moist mass to a temperature of about 0° F. for a sufficient duration of time to freeze the foreign matters but not the wool, and then removing the hard frozen foreign matters from the wool.

6. The process of cleaning wool or other animal fibres of solid extraneous foreign matters clinging thereto; consisting in moistening the mass of wool and foreign matters, removing surplus water, subjecting the moist mass to a temperature above the freezing point of wool for a time sufficient to freeze the moisture in or on the extraneous matters while fluffing the wool fibres, and separating the frozen matters therefrom.

7. The process of cleaning wool or other animal fibres of extraneous solid foreign matters clinging thereto; consisting in washing the mass, removing surplus water therefrom, subjecting the moist mass to a temperature of about 0°F. for a time sufficient to freeze the foreign matters but not the wool; and subjecting the mass to a mechanical device whereby the frozen foreign matters are separated from the wool.

8. The process of cleaning wool or other animal fibres of extraneous vegetable and mineral matters clinging thereto; consisting in washing the mass, removing surplus water therefrom, subjecting the moist mass to a low temperature for a time sufficient to freeze the foreign matters but not the wool; separating the mass into a distended or thin layer during the freezing step, and subjecting the layer to a mechanical device whereby the frozen foreign matters are separated from the wool.

9. The process of cleaning wool or other animal fibres of solid extraneous foreign matters clinging thereto; consisting in washing the mass, removing surplus water therefrom, separating the moist mass into a distended or thin layer, subjecting the moist layer to a temperature for a sufficient time to freeze the foreign matters but not freeze the wool; and finally subjecting the layer to a mechanical device whereby the frozen foreign matters are separated from the wool.

ROBERT M. GREENLEAF.